No. 659,417. Patented Oct. 9, 1900.
J. C. PERRY.
SELF ADJUSTING CIRCUIT BREAKER FOR ELECTRICAL WELDING MACHINES.
(Application filed Mar. 26, 1900.)
(No Model.) 2 Sheets—Sheet 1.
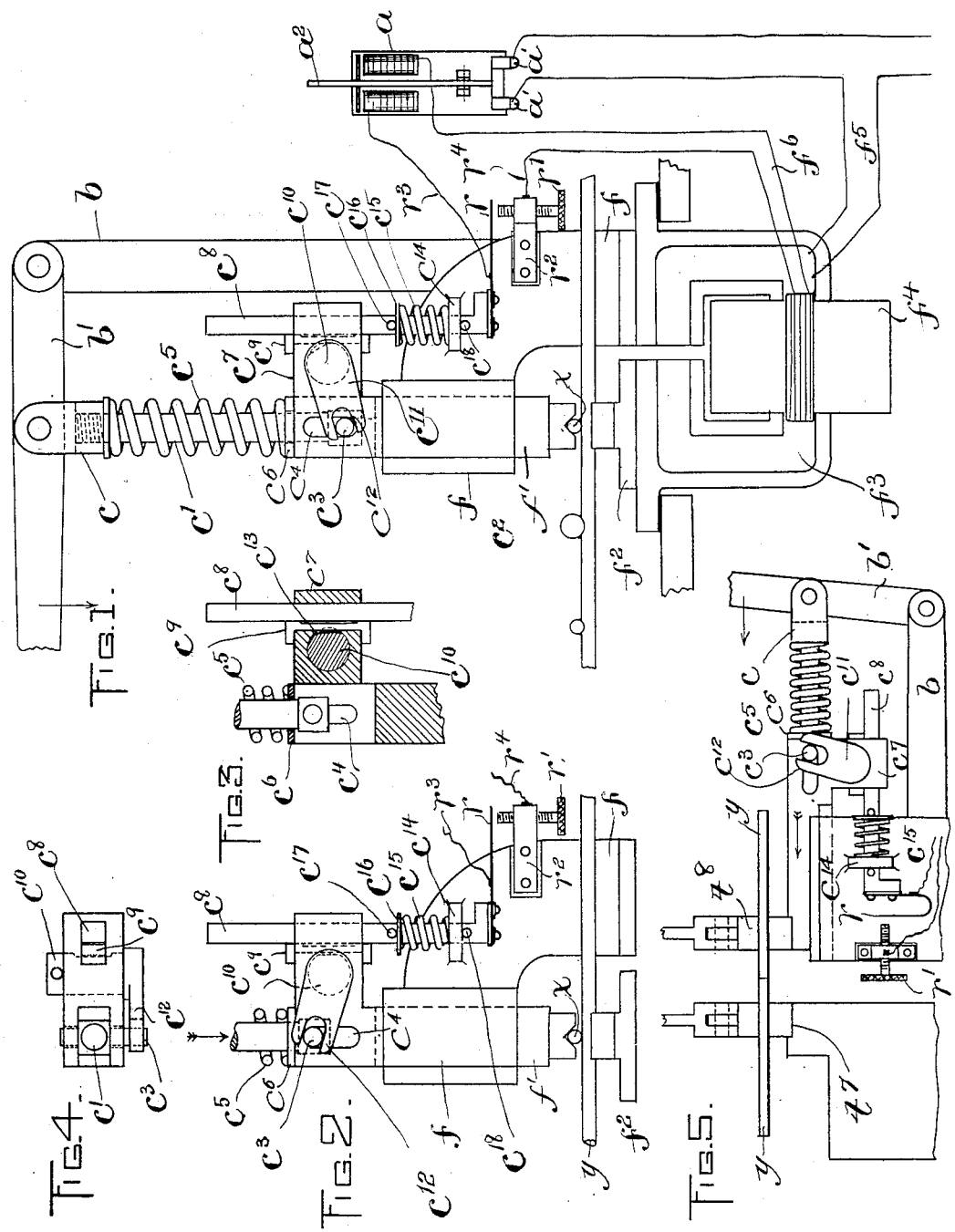

No. 659,417. Patented Oct. 9, 1900.
J. C. PERRY.
SELF ADJUSTING CIRCUIT BREAKER FOR ELECTRICAL WELDING MACHINES.
(Application filed Mar. 26, 1900.)
(No Model.) 2 Sheets—Sheet 2.
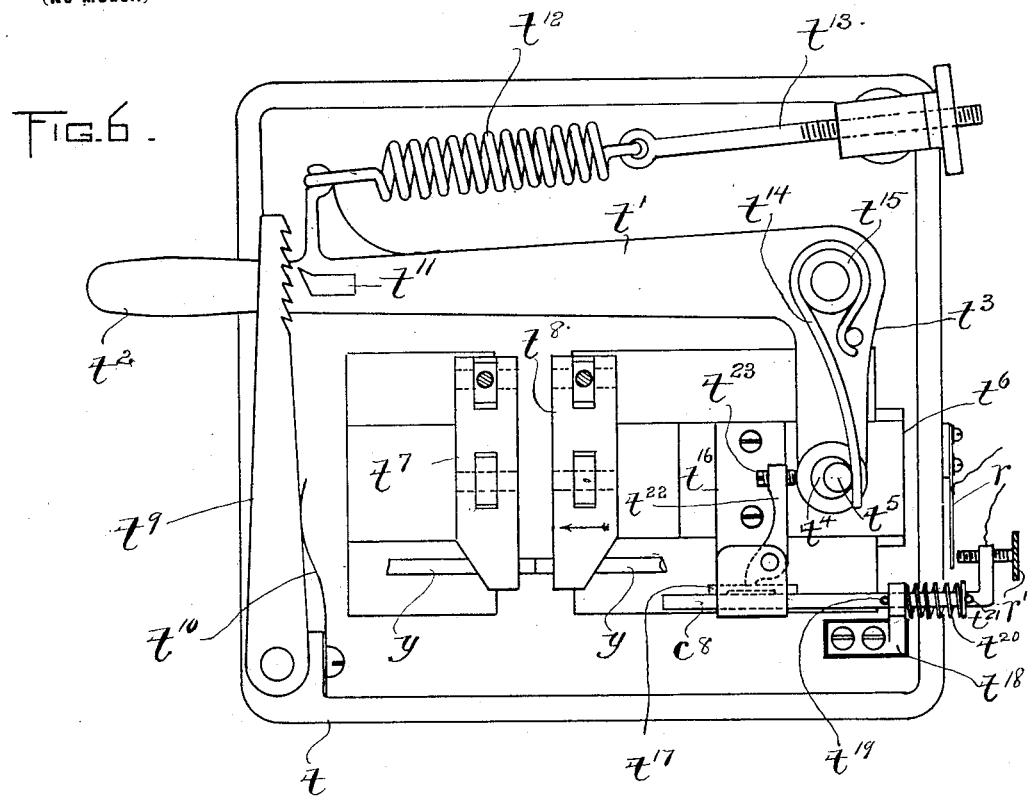
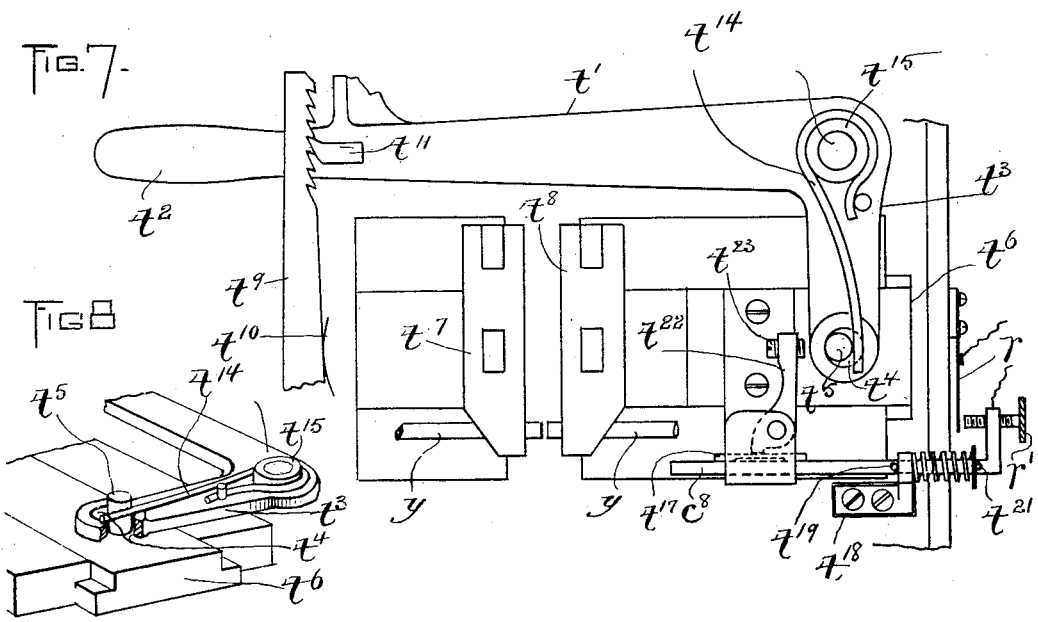
WITNESSES: INVENTOR:

UNITED STATES PATENT OFFICE.

JOHN C. PERRY, OF CLINTON, MASSACHUSETTS.

SELF-ADJUSTING CIRCUIT-BREAKER FOR ELECTRICAL WELDING-MACHINES.

SPECIFICATION forming part of Letters Patent No. 659,417, dated October 9, 1900.

Application filed March 26, 1900. Serial No. 10,149. (No model.)

*To all whom it may concern:*

Be it known that I, JOHN C. PERRY, of Clinton, in the county of Worcester and State of Massachusetts, have invented certain new and useful Improvements in Self-Adjusting Circuit-Breakers for Electrical Welding-Machines, of which the following is a specification.

This invention has for its object the production of a self-adjusting circuit-breaker for electrical welding-machines; and it consists in the novel features of construction and relative arrangement of parts hereinafter fully described in the specification, clearly illustrated in the drawings, and particularly pointed out in the claims.

Figure 1 represents the front elevation of a circuit-breaker constructed in accordance with my invention, so much only of the machine being shown as is necessary to illustrate the operation of the invention, the plunger having been forced in contact with the object to be welded and the contact-rod locked to the plunger. Fig. 2 represents a similar view showing the position of the parts when the plunger first engages the object to be welded, but before the contact-rod has been locked to the plunger. Fig. 3 represents a detail view of the mechanism for locking the contact-rod to the plunger. Fig. 4 represents a top plan view of the mechanism shown in Fig. 3. Fig. 5 represents a view similar to Fig. 2, showing the device applied to a butt-welding machine. Fig. 6 represents a view of a standard welding-machine, showing a different form of mechanism for locking the contact-rod to the movable clamp, the parts being shown in the position they occupy after the members to be welded have been brought in contact and the end pressure applied and after the contact-rod has been locked to the movable clamp. Fig. 7 represents a similar view showing the position of the parts before pressure has been applied to the parts to be welded and before the contact-rod is locked to the movable clamp. Fig. 8 is a detail perspective view showing the method of connecting the lever to the slide of the movable clamp.

In making butt-welds, prior to my invention, unless the ends of the bars project practically the same distance from the opposing faces of the clamps at successive welding operations, the upset will be either greater or less than desired, owing to the fact that the circuit-breaker-operating means has not been self-adjusting in such machines.

In welding two members together, as shown in Sheet 1, prior to my invention any variation in the thickness of the two members from a predetermined standard would vary the amount of upset given, owing to the fact that the circuit-breaker-operating means in the case discussed and in butt-welding machines referred to has not been self-adjusting, but cut off the current at a predetermined point irrespective of the amount of upset that had taken place at that instant. For structural as well as commercial reasons it is important that the upset given to the welds be as nearly uniform as possible, and it is this that my present invention secures.

Instead of making the point at which the current shall be cut off depend upon the position of the movable clamp or welding member and irrespective of the amount of upset at that point, as heretofore, I provide means whereby the circuit-breaker-operating means are inoperative until the parts to be welded have been brought in contact, the further motion of the movable welding-jaw operating the contact, so that in all cases, irrespective of the initial position of the parts or the thickness of the material or the wearing of the dies or slight variations in the position of the parts, the current is automatically cut off after a predetermined amount of upset motion has been given the movable welding jaw or clamp.

Referring to the drawings, $f$ represents the bracket of an ordinary welding-machine, carrying at one end the terminal $f'$ or the movable welding-jaw and at its other end the terminal $f^2$ or the stationary welding jaw or member.

$f^3$ represents the channel, occupied by the ordinary primary coil, and $f^4$ the iron core, usual in such machines.

$f^5$ represents the primary circuit, leading to the primary coil in $f^3$.

$f^6$ represents the circuit from the iron core $f^4$ to the electromagnets of the circuit-breaker $a$, by which said magnets are vitalized to break the primary circuit, as hereinafter described. The primary circuit $f^5$ is connected to the circuit-breaker $a$ by two contact-screws $a'$. The circuit-breaker $a$ is a well-known conventional type and it does not require specific description in connection with the present invention, it being enough to say that the primary circuit is broken when the bar $a^2$ is released and that the circuit is closed when the bar $a^2$ is depressed. Any preferred form of circuit-breaker may be employed—mechanical or magnetic.

My invention is equally applicable to hand or power machines; but for the sake of explaining my invention without involving it too much with the complicated parts of a power-machine I have chosen to do it in connection with a machine where the movable welding-jaw is operated by hand-power.

$b$ represents a bracket or standard connected to the framework of the machine.

$b'$ represents a lever pivoted at one end to the top of the standard $b$.

$c$ represents a lug pivoted to the lever $b'$ at such a point between the ends of the lever as will give the desired amount of power. A bar $c'$ is connected at one end to the lug $c$ and at its other end loosely connected to the movable plunger or welding-jaw $c^2$. This loose connection is effected by means of the pin $c^3$ on the rod $c'$, arranged in a slot $c^4$ of the welding-jaw $c^2$.

$c^5$ represents a spring arranged about the rod $c'$, bearing at one end on a shoulder on the stud $c$ and at its opposite end against a collar $c^6$ on the upper end of the welding-plunger $c^2$. By this construction it will be evident that the spring $c^5$ tends to keep the pin $c^3$ at the upper end of the slot $c^4$ and the plunger $c^2$ and the rod $c'$ at their joint maximum length. As the lever $b'$ is depressed before the plunger $c^2$ is in engagement with the object $x$ to be welded, the pin $c^3$ is kept at the upper end of the slot $c^4$ until after the jaw has engaged the work. Further pressure immediately thereafter upon the lever $b'$ is transmitted to the plunger $c^2$ through the medium of the spring $c^5$, causing the pin $c^3$ to travel from the upper to the lower end of the slot $c^4$. After this motion is completed the pressure upon the lever $b'$, to form the desired upset of the softened metal, is transmitted to the plunger $c^2$ by reason of the contact of the pin $c^3$ with the lower walls of the slot $c^4$. The first of the motions above described may be called the "preliminary motion," which consists in bringing the welding-jaws in contact with the parts to be welded. The second motion may be termed the "circuit-breaker-adjusting motion," by which after the welding-jaws are in contact with the parts to be welded the contact-carrying rod is locked to the movable welding-jaw, so that when a predetermined further movement of the welding-jaw in forming an upset has been accomplished the said rod traveling with the jaw effects the breaking of the circuit after a predetermined amount of upset, irrespective of the total travel of the welding-jaw or the thickness of the material. The third motion above described may be termed the "upsetting motion," the contact-carrying rod being inoperative during the first two motions and being locked to and moving with the welding-jaw during the third or upsetting motion.

$c^7$ represents a lug extending out from the upper end of the plunger-bar $c^2$.

$c^8$ represents a contact-bar mounted in the aperture in the lug $c^7$.

$c^9$ represents a gib arranged in the aperture in which the rod $c^8$ is mounted and in contact with said rod, so that by forcing said gib against the rod the latter may be locked to the lug $c^7$.

$c^{10}$ represents a cam mounted in the lug $c^7$, provided with an arm $c^{11}$, having a fork $c^{12}$, in which is arranged the pin $c^3$. When the arm $c^{11}$ is in the position shown in Fig. 2, a depressed part $c^{13}$ on the cam comes opposite the gib, so that no pressure is applied to the gib to force it against the rod $c^8$. After the first motion, heretofore referred to, has been completed and as the pin $c^3$ travels from the upper to the lower end of the slot $c^4$ during the second motion the arm $c^{11}$ is carried from the position shown in Fig. 2 to the position shown in Fig. 1, thereby bringing the depressed part $c^{13}$ on the cam away from the gib and bringing the cam or the elevated part of the cam in contact with the said gib, forcing the latter against the rod and locking the rod to the lug $c^7$, so that during the third or upsetting motion of the plunger the rod $c^8$ moves with the plunger, the rod $c^8$ being liberated as the plunger $c^2$ and the pin $c^3$ return to the positions shown in Figs. 2 and 3.

The rod $c^8$ is mounted to slide in the lug $c^7$ and also in the lug $c^{14}$.

$c^{15}$ is a spring arranged about the rod $c^8$ and bearing upon one end against a collar $c^{16}$, held in position on said rod by a pin $c^{17}$, the spring at its other end bearing against the lug $c^{14}$.

$c^{18}$ represents a pin in said rod that limits the upward movement of the latter.

$r$ represents a contact-plate carried by the lower end of the rod $c^8$ and insulated therefrom.

$r'$ represents a contact-screw carried by a bracket $r^2$ on the bracket $f$ and insulated therefrom. The contact-plate $r$ is connected to the magnet of the circuit-breaker $a$ by a wire $r^3$. The contact-screw $r'$ is connected by a wire $r^4$ to the coil on the iron core $f^4$, the arrangement being such that when the plate $r$ engages the screw $r'$ the circuit from the core $f^4$ to the magnets of the circuit-breaker $a$ is closed and said magnets energized to release the lever $a^2$ to break the primary circuit.

Referring to Figs. 6, 7, and 8, where I have shown a modified form of the connection between the contact-rod $c^8$ and the slide of the movable clamp, $t$ represents a framework upon which is pivoted at its angle a bell-crank pressure-lever $t'$, having a handle $t^2$ and a short arm $t^3$, provided at its end with an aperture $t^4$, in which is arranged a pin $t^5$, projecting from the upper face of the slide $t^6$ of the movable clamp, the pin $t^5$ being considerably smaller than the aperture $t^4$, in which it is arranged, in order to permit the movement of the slide $t^6$ independent of the arm $t^3$. The stationary clamp $t^7$ corresponds to the welding-jaw $f^2$ in Fig. 1, while the movable clamp $t^8$ corresponds to the movable welding-jaw $c^2$ in Fig. 1, the clamps $t^7$ $t^8$ being connected to the secondary circuit of the transformer after the manner referred to in Fig. 1. This form of welding device is particularly adapted for making what are known as "butt-welds," the parts $y$ to be welded being held in the clamps $t^7$ $t^8$ in an ordinary and well-known manner.

$t^9$ represents a ratchet-bar pivoted at one end of the casing and having a leaf-spring $t^{10}$, arranged to throw and hold it out of connection with the dog $t^{11}$ on the long arm of the lever $t'$. The dog and ratchet-bar are arranged to hold the lever $t'$ and with it the slide $t^6$ and its movable clamp $t^8$ in an inoperative welding position during the positioning of the parts $y$ $y$ in the clamps. When the parts are positioned, the ratchet-bar is released from the dog and a spring $t^{12}$, connected at one end to the lever $t^2$ and at its other end to an adjusting-screw $t^{13}$, secured to the framework $t$, pulls the long arm of the lever $t'$ in Fig. 6 upward, thereby moving the clamp $t^8$ to the left in Fig. 6 to bring this part $y$ in contact with the part $y$ of the clamp $t^7$.

$t^{14}$ represents a spring arranged about a boss $t^{15}$ of the lever $t'$ and having its free end arranged to bear against the side of the pin $t^5$, that is opposite the side of said pin where the movable jaw $t^8$ is located, said spring tending to keep the pin $t^5$ in normal engagement with the forward wall of the aperture $t^4$, as shown in Fig. 7. The contact-screw $r'$ and the contact-plate $r$ are connected up to the magnet of the circuit-breaker and to the coil on the iron core $f^4$, as in Fig. 1, but with this difference, as far as arrangement is concerned, that the contact-plate, Fig. 6, is stationary, while the contact-screw is connected to the contact-bar and is movable. The contact-bar $c^8$ is arranged in an aperture in a plate $t^{16}$, secured to the slide $t^6$. The gib $t^{17}$ is arranged in said aperture and bears against the rod $c^8$. The rod $c^8$ is also arranged in an aperture in the bracket $t^{18}$ and held against undue reverse motion by a pin $t^{19}$, engaging the bracket $t^{18}$. A spring $t^{20}$ is arranged about the rod $c^8$, between the bracket $t^{18}$ and a collar supported by a pin $t^{21}$, said spring tending to keep the contact-screw $r'$ out of engagement with the plate $r$.

$t^{22}$ represents a lever pivoted between its ends to the bracket $t^{16}$. One arm of this lever is shown as arranged to engage the gib $t^{17}$ after the manner of the cam $c^{10}$ in Fig. 3, while the other end of the lever is provided with an adjustable part $t^{23}$, adapted to be engaged by the end of the short arm $t^3$. This form of device, like the form shown in Figs. 1 to 5, may be said to have three movements— a preliminary movement to bring the parts $y$ $y$ to be welded in contact, a second movement for locking the contact-rod to the slide $t^6$, and a third movement for performing the upsetting. After the parts $y$ $y$ have been placed in the clamps $t^7$ $t^8$ the ratchet-bar $t^9$ is released and the spring $t^{12}$ permitted to operate the lever $t'$. The first motion of said lever carries the end of said lever having the aperture $t^4$ forward to bring the parts $y$ $y$ to be welded in contact. The further motion of the lever carries the end having the aperture $t^4$ from the position shown in Fig. 7 to the position shown in Fig. 6, bringing the said end in engagement with the adjustable part $t^{23}$, thereby operating the lever $t^{22}$ and locking the contact-bar $c^8$ to the bracket $t^{16}$ and the slide $t^6$. The further movement of the lever $t'$ forms the desired upset in the contacting ends of the parts to be welded, the amount of said upsetting motion being limited by the contact-screw $r'$, engaging the plate $r$. When the weld is completed, the lever $t'$ is returned to its normal position and locked by the dog and ratchet $t^{11}$ $t^9$, the other parts resuming the position in which they appear in Fig. 7. The spring $t^{14}$ is sufficiently strong to move the slide $t^6$ against the forward wall of the aperture $t^4$, but is of less strength than the spring $t^{12}$, so that as the rearward wall of the aperture $t^4$ comes in contact with the pin the spring $t^{12}$ controls or overcomes the force of the spring $t^{14}$, the spring $t^{14}$ being strong enough to bring the parts to be welded in contact independently of the action of the spring $t^{12}$. The spring $t^{14}$ is of sufficient strength to force the parts to be welded in contact when the lever $t'$ is liberated. The work of giving the parts their upsetting motion is performed by the spring $t^{12}$.

From the foregoing it will be seen that I have provided automatically-acting means for making welds having a predetermined amount of upset irrespective of the thickness of the parts to be welded, their relative positions in the clamping-jaws, or other conditions that heretofore have caused a variation of the amount of upset given the weld and which could only be overcome or remedied by making at each weld a separate adjustment of the contact-screw to remedy the particular feature of that particular weld, whether of different size or material or the condition of the welding-jaws that would produce a variation in the amount of the upset.

By "upset" in this specification I wish to be understood as referring to the amount of displacement given by the movable welding-jaw to the softened metal, said metal after it becomes softened being displaced directly in proportion to the amount of motion given or permitted the movable welding-jaw after the metal softens.

By "upset" I do not wish to be understood as referring to the softening of the ragged edges and irregularities of the faces of the parts to be welded in order to bring the faces proper in contact, but only to the union and substantial displacement of the parts, the upset being the movement in the line of pressure that occurs in making the weld after the material of the opposing faces becomes sufficiently softened. The springs $t^{14}$ or $c^5$ should be strong enough so that when the current is first applied they will move up the jaw as the ragged edges, if there are any, soften to break them down and bring the opposing faces proper of the parts to be welded in contact.

Having thus explained the nature of my invention and described a way of constructing and using the same, though without attempting to set forth all of the forms in which it may be made or all the modes of its use, what I claim, and desire to secure by Letters Patent, is—

1. In an electrical welding apparatus, in combination, a circuit-breaker, means controlled by the amount of upset for operating said circuit-breaker, whereby a predetermined amount of upset is automatically produced, irrespective of the irregularities in the size and shape of the parts to be welded.

2. In an electrical welding apparatus, in combination, a circuit-breaker, a contact device arranged to control said circuit-breaker, means for operating said contact device arranged to be actuated only during the upset motion of the welding-jaw.

3. In an electrical welding apparatus, in combination, a circuit-breaker, a contact device arranged to control said circuit-breaker, means for operating said contact device, so arranged that the contact device cannot operate until a predetermined upset has been secured.

4. In an electrical welding apparatus, in combination, a circuit-breaker, means for operating the same, including a movable member, a movable welding-jaw, means for causing the said member to be moved only during the upsetting motion of the said jaw.

5. In an electrical welding apparatus, in combination, a circuit-breaker, means for operating said circuit-breaker, a movable welding-jaw, connections between said jaw and circuit-breaker means, and means arranged to give said jaw an initial motion to seat the work, thereafter to put said circuit-breaker means under control of said jaw, then to give said jaw its upsetting motion, said circuit-breaker means being arranged to operate a circuit-breaker after a predetermined amount of upset has been produced.

6. In an electrical welding apparatus, in combination, a circuit-breaker, means for operating said circuit-breaker, a movable welding-jaw, means for operating said jaw, a loose connection between said jaw and its operating means having provision for putting said circuit-breaker means under control of said jaw, whereby said jaw may be given an initial movement to seat the work without affecting the circuit-breaker means; thereafter, said circuit-breaker means to be put under control of said jaw, and then said jaw to be moved to produce the required amount of upset, the parts being so arranged that the amount of upset automatically controls the time or point at which the circuit-breaker should be operated.

7. In an electrical welding apparatus, in combination, a circuit-breaker, means for operating said circuit-breaker, a movable welding-jaw, connections between said jaw and the circuit-breaker means, and means for operating said jaw having provision for moving said jaw to securely seat the parts to be welded, irrespective of the irregularities in the size and shape of said parts, or their contact ends or points, without affecting the said circuit-breaker means, thereafter to put said circuit-breaker means under control of said jaw, and then to move said jaw to produce the required amount of upset, the circuit-breaker-operating means being so timed that they operate the circuit-breaker only when the predetermined amount of upset has been produced.

8. In an electrical welding apparatus, in combination, a current-controller, a movable welding-jaw, and automatically-adjusting connections between said jaw and controller whereby a predetermined amount of upset is automatically produced irrespective of the seating position of the jaw.

9. In an electrical welding apparatus, in combination, a current-controller, a movable welding-jaw, automatically-acting connections between said jaw and controller whereby the jaw can seat at varying positions, depending upon the parts to be welded, and thereafter have a predetermined welding movement.

10. In an electrical welding apparatus, in combination, a movable welding-jaw, and automatic means for seating said jaw at varying positions, depending upon the parts to be welded, and thereafter giving the said jaw a predetermined welding movement.

11. In an electric welding apparatus, in combination, a movable welding-jaw, a current-controller having a movable member, and means whereby the jaw may be automatically moved to seat the work without affecting the relative position or relation of said movable member to its complemental member.

In testimony whereof I have affixed my signature in presence of two witnesses.

JOHN C. PERRY.

Witnesses:
A. D. HARRISON,
H. L. ROBBINS.